United States Patent
Suggs, III

(10) Patent No.: US 8,234,786 B2
(45) Date of Patent: Aug. 7, 2012

(54) TWO-PIECE SEALING DEVICE

(75) Inventor: James W. Suggs, III, Braselton, GA (US)

(73) Assignee: Garlock Sealing Technologies LLC, Charlotte, NC (US)

( * ) Notice: Subject to any disclaimer, the term of this patent is extended or adjusted under 35 U.S.C. 154(b) by 136 days.

(21) Appl. No.: 12/759,048

(22) Filed: Apr. 13, 2010

(65) Prior Publication Data

US 2011/0089641 A1    Apr. 21, 2011

Related U.S. Application Data

(62) Division of application No. 11/518,158, filed on Sep. 11, 2006, now Pat. No. 7,766,340.

(60) Provisional application No. 60/716,284, filed on Sep. 12, 2005.

(51) Int. Cl.
*B21D 53/84* (2006.01)
(52) U.S. Cl. ........................................ 29/888.3
(58) Field of Classification Search .................. 29/888.3
See application file for complete search history.

(56) References Cited

U.S. PATENT DOCUMENTS

| 128,737 A | 7/1872 | Lee |
|---|---|---|
| 616,867 A | 12/1898 | Dudley |
| 707,930 A | 8/1902 | Kirschning |
| 833,932 A * | 10/1906 | Kube .......................... 277/520 |
| 990,017 A | 4/1911 | Shull |
| 1,914,343 A | 6/1933 | Mahan |
| 2,132,010 A | 10/1938 | Barry |
| 2,692,152 A | 10/1954 | Tremolada |
| 2,723,867 A | 11/1955 | Howard et al. |
| 3,076,659 A | 2/1963 | Kremer, Jr. |
| 3,542,374 A | 11/1970 | Neilson et al. |
| 3,853,328 A | 12/1974 | Pierce |
| 4,807,890 A | 2/1989 | Gorman et al. |
| 5,657,785 A | 8/1997 | Wolford et al. |
| 5,772,396 A | 6/1998 | Rockwood |
| 6,023,826 A | 2/2000 | Harrelson, III et al. |
| 6,045,136 A | 4/2000 | White |
| 6,182,974 B1 | 2/2001 | Harrelson, III |
| 6,273,431 B1 * | 8/2001 | Webb ............................ 277/529 |

OTHER PUBLICATIONS

International Searching Authority "Notification of Transmittal of the International Search Report and the Written Opinion of the International Searching Authority, or the Declaration" May 30, 2007.

* cited by examiner

*Primary Examiner* — David Bryant
*Assistant Examiner* — Moshe Wilensky
(74) *Attorney, Agent, or Firm* — Holland & Hart LLP

(57) ABSTRACT

A method for installing an auxiliary ring around a shaft. The method comprises providing an auxiliary ring comprising a plurality of ring elements, wherein each ring element includes at least one radial joint. Each ring element is installed around the shaft and positioned such that the radial joint of at least one of the ring elements is rotationally offset from the radial joint of each adjacent ring element. The plurality of ring elements are then secured to each other by adhesive, welding, or a fastener. Each ring element may include an aperture wherein the aperture of each ring element is aligned with the aperture of each adjacent ring element.

17 Claims, 7 Drawing Sheets

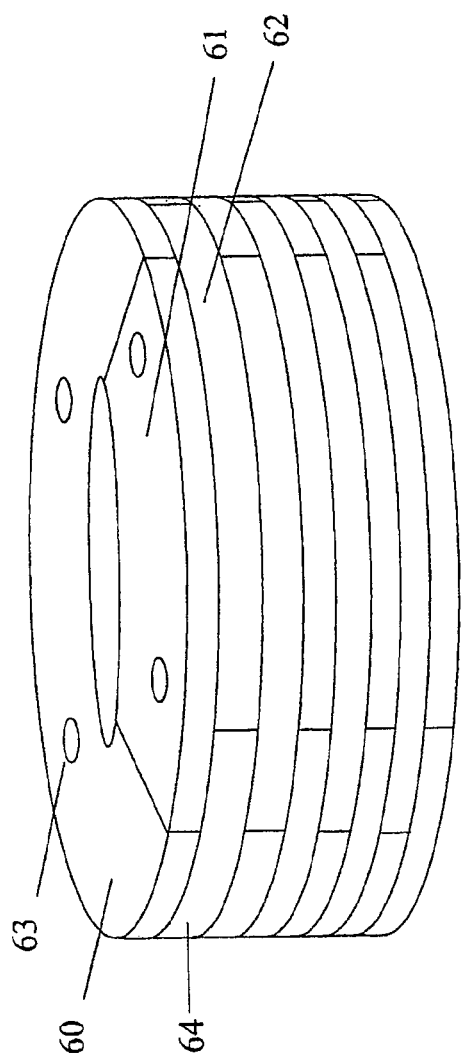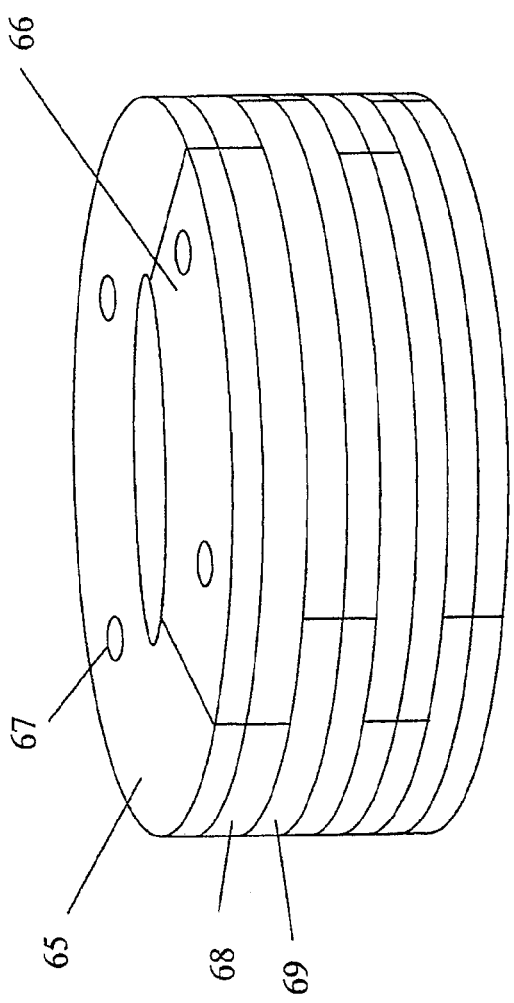
FIG. 6a
FIG. 6b

TWO-PIECE SEALING DEVICE

CROSS-REFERENCE TO RELATED APPLICATIONS

This application is a division of U.S. patent application Ser. No. 11/518,158, filed Sep. 11, 2006, which claims the benefit of U.S. Provisional Patent Application No. 60/716,284, filed Sep. 12, 2005, the disclosures of which are hereby incorporated by reference in their entireties.

FIELD OF THE INVENTION

The present invention relates generally to an element for sealing along a rotary member. More particularly, the present invention relates to a two-piece sealing element for use in a stuffing box assembly.

BACKGROUND

Compression packing is used to control leakage about shafts. Compression packing generally has an assembly of radially expandable rings that coaxially surrounds a shaft. Such packing is used in a wide variety of applications including packing for pumps, valves and hydraulic and pneumatic equipment. Shafts are conventionally surrounded by a compartment generally extending outward from the housing surrounding the shaft referred to as a "packing box" or "stuffing box." The interior of the stuffing box is generally of a diameter sufficiently greater than the shaft to accommodate compressible "packing rings" and a number of relatively non-compressible auxiliary rings.

The packing rings in the stuffing box are compressed by an annular "gland" fitted about the shaft and bolted to the exterior of the stuffing box. Axial compressive loading force from the gland is applied to the packing rings, causing them to expand radially to some extent, forcing the inner peripheries against the outer surface of the shaft and causing the packing rings to fill the stuffing box. This aims to prevent or minimize the escape of the contents of the housing at the intersection of the shaft and housing. Tightening of the gland is conventionally by means of a flange. Bolts pass through the flange and are threaded into threaded holes in the stuffing box. When the gland is tightened, the packing rings are further compressed in the stuffing box.

The auxiliary rings employed in packing sets include bushing rings, excluder rings, spacer rings, gaskets, restriction bushings, lantern rings, flush rings, or combinations thereof. These auxiliary rings are generally constructed of non-compressible materials and aid in the retention and/or function of the compressible packing rings. Traditionally, when maintenance is performed on a stuffing box assembly, the entire apparatus must be disassembled and the rings must be removed from the stuffing box, new rings put in place, and the apparatus is reassembled.

Additionally, this requires the removal of machine parts that surround or are adjacent to the part being sealed, such as the rotary member, in order to allow ample access room to permit ring replacement. Disassembly and re-assembly of such parts often require a great expenditure of time and labor, along with a consequent monetary cost. For example, where a shaft extends from a housing, the exterior bearing or journal member for such shaft, as well as the coupling parts to the shaft and external parts of the housing, may have to be removed before the integral seals can be brought into access position for removal. The cost for such repair may be considerable, as product is lost during the interval of machine downtime.

One conventional solution to this problem is to provide split-ring elements, which are used in many applications wherein integral solid seals would be difficult or time-consuming to install. Employment of split seals may reduce the time for replacing a seal from 24 hours (if a solid integral seal was employed) to less than an hour. Split seals can be slipped around the shaft without dismantling the apparatus and are frequently bolted together, squeezed together with an "O" ring or squeezed together on a taper.

Bolted split seal elements are relatively expensive and generally require a large amount of space for the seal. Split seal elements that are squeezed together with an "O" ring are generally limited to use with respect to shafts having a low rotational speed, since centrifugal forces tend to open the split halves at high rotational speeds. While split seal elements which are squeezed together with a taper are somewhat more adaptable, the alignment of surfaces has to be near perfect in order to prevent leakage. Further, while generally providing for more flexibility in the shaft diameter ranges in which they may be employed, split seal elements like integral-solid seals suffer from a relatively inflexibility in the array of rotary diameters on which they may be employed.

SUMMARY OF THE INVENTION

It would, therefore, be desirable to provide a system of and a method for constructing ring elements that can be installed in a stuffing box assembly without the need for dismantling the apparatus, while overcoming the disadvantages of split seals of the prior art.

In a first exemplary embodiment, a system for positioning around a rotary element comprises a substantially circular ring element having a circumference around an outer edge of the ring element. The ring element comprises a first section comprising a first section outer rounded edge, a first section first mating edge, a first section inner rounded edge, and a first section second mating edge. A second section comprises a second section outer rounded edge, a second section first mating edge for abutting the first section first mating edge, a second section inner rounded edge, and a second section second mating edge for abutting the first section second mating edge. The first section outer rounded edge and the second section outer rounded edge form the circumference of the outer edge of the ring element when the first section first mating edge and the second section first mating edge are substantially aligned and when the first section second mating edge and the second section second mating edge are substantially aligned.

In a second exemplary embodiment, a system comprises at least two rings, each ring comprising a first ring component and a second ring component each comprising a substantially flat top and bottom, a substantially circular outer edge, a substantially circular inner edge, and a pair of complementary edges between the outer edge and the inner edge. The complementary edges on the first ring component align with the complementary edges on the second ring component to form a ring. The outer edges of the first and second ring components comprise the circumference of the first ring or the second ring when the first and second sections are aligned. The first ring is positioned on top of the second ring to align the outer edges of the first and second rings.

In a third exemplary embodiment, a method for producing a ring, the ring comprising a first section comprising a first section outer rounded edge, a first section first mating edge, a first section inner rounded edge, and a first section second mating edge, and a second section comprising a second section outer rounded edge, a second section first mating edge for abutting the first section first mating edge, a second section inner rounded edge, and a second section second mating edge for abutting the first section second mating edge, wherein the first section outer rounded edge and the second section outer rounded edge form the circumference of the outer edge of the ring element when the first section first mating edge and the second section first mating edge are substantially aligned and when the first section second mating edge and the second section second mating edge are substantially aligned, the method comprising the steps of cutting the first section and second section from a sheet material and aligning the first and second sections.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE FIGURES

The present invention will be more clearly understood from a reading of the following description in conjunction with the accompanying exemplary figures wherein:

FIGS. 6a and 6b show a system of rings according to embodiments of the present invention;

DETAILED DESCRIPTION

Reference will now be made in detail to the preferred embodiments of the present invention, examples of which are illustrated in the accompanying drawings.

A method, according to one embodiment, for manufacturing and installing components in a stuffing box packing assembly is as follows. Generally, rings can be constructed in a two-piece design that can allow installation and removal of the rings without substantial disassembly of the apparatus. Although the embodiments described herein refer to a two-piece design, it is understood that more than two pieces can be used. Further, the rings of the present invention can be substantially locked together, thereby providing additional stability and a tighter seal. Moreover, although the embodiments described herein refer to a ring design, it is understood that other shapes and configurations can be used.

Figure 2:
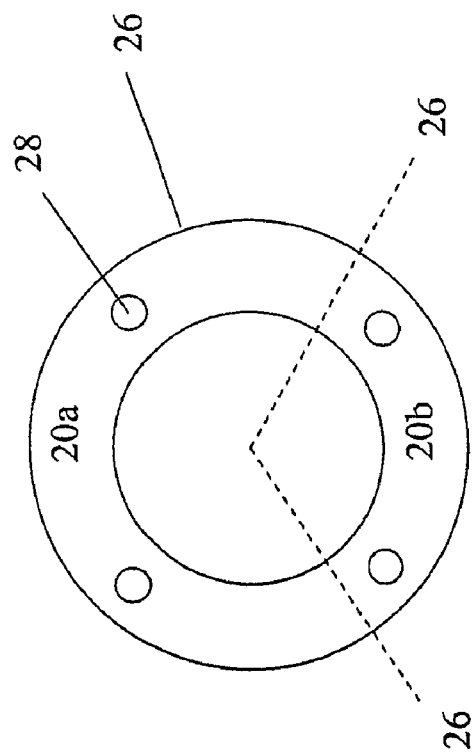
FIG. 2 shows a ring having a first section and a second section according to an embodiment of the present invention.
Figure 1A:
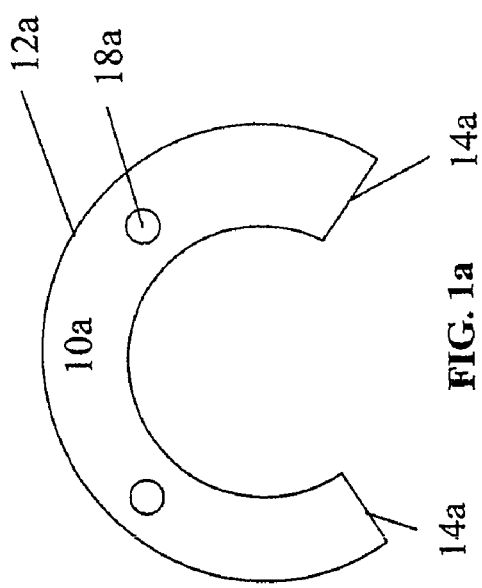
FIG. 1a shows a first section of a ring according to an embodiment of the present invention.
Figure 1B:
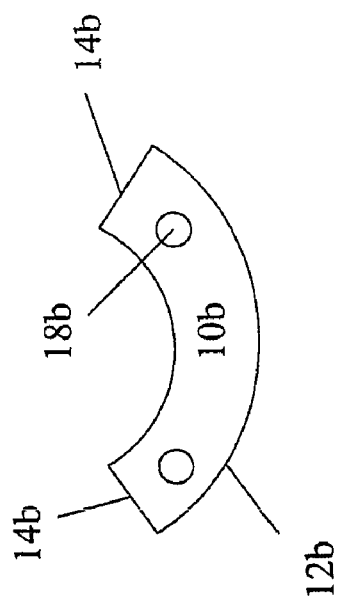
FIG. 1b shows a second section of a ring according to an embodiment of the present invention.

In one embodiment, illustrated in FIGS. 1a, 1b and FIG. 2, a ring R comprises a first section 10a, 20a and a second section 10b, 20b. In this embodiment, an outer surface 12a of the first section 10a has a greater length than an outer surface 12b of the second section 10b, wherein the outer surface 12a of first section 10a and the outer surface 12b of second section 10b comprise the outer circumference of the ring 26. In other words, the first section 10a, 20a comprises a majority of the circumference of the ring 26 and the second section 10b, 20b comprises a minority of the circumference of the ring 26. In one embodiment, the first section 10a, 20a comprises about ⅔ of the circumference of the ring 26.

The first section 10a substantially mates or aligns with second section 10b to form the ring 26. More specifically, edges 14a of the first section 10a can align with edges 14b of the second section 10b. In this embodiment, the edges 14a and 14b are along an axis directed radially inwardly towards the center of the ring 26. As shown in FIG. 2, a dotted line 26 represents the radially inward axis along which the edges 14a, 14b are configured. However, the present invention is not intended to be limited to this configuration. In other exemplary embodiments, the edges are not substantially straight and/or is not aligned with an axis directed radially inwardly towards the center of the ring 26. Additionally, the edges can comprise flanges or other shapes that can engage the mating section.

When the first section 14a and the second section 14b are substantially aligned, a complete ring 26 is formed, as shown in FIG. 2. Conventionally, apertures can be provided in a ring. Accordingly, in order to compliment standard ring configurations, a plurality of apertures 18a, 18b, 28 can be provided through the faces of the ring 26 for receiving a fastening device. As illustrated in the FIGS. 1a, 1b, 2, and 3a, in a standard configuration comprising four apertures 18a, 18b, 28 along the face of the ring 26, each of the first section 14a and the second section 14b have two apertures 18a, 18b. Alternatively, the ring 26 can have any number of apertures or none at all.

In an alternative embodiment, two or more rings 26 can be stacked to construct a composite ring. The rings can be stacked such that the first section and the second section of each successive ring unit are rotated about the axis so at least two of the ring units have different alignment of the first and second sections. In this manner, a "brick like" configuration of intermeshing ring segments can be constructed. Additional ring units can be stacked in this staggered pattern until a complete ring of desired height is constructed. Apertures in the composite ring can align with each ring and extend substantially and completely through the composite ring.

Figure 3A:
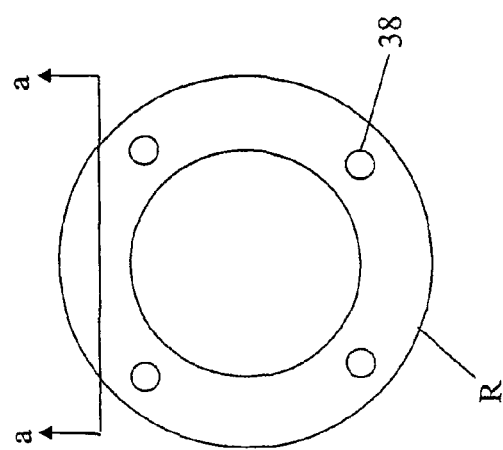
FIG. 3a shows a top view of a ring according to an embodiment of the present invention.
Figure 3B:
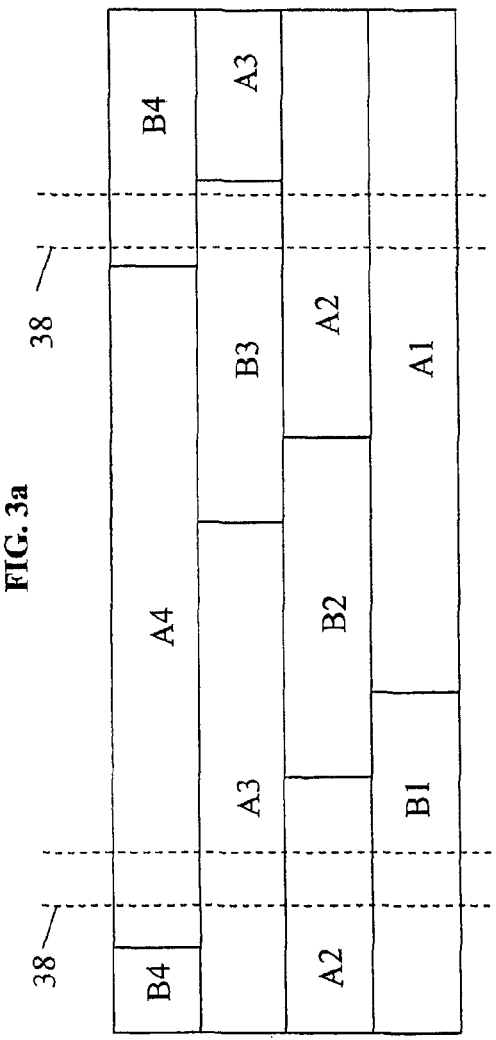
FIG. 3b shows a cross section of a ring according to an embodiment of the present invention.

FIGS. 3a-3b and 4a-4b illustrate a complete ring having four layers of ring units, each layer comprising a first section and a second section. However, as discussed earlier, the ring can have more or less than four layers. FIG. 3a shows a top view of a ring R having a plurality of layers of rings and a plurality of apertures 38. As shown in FIG. 3b, a cross section of composite ring R through line a-a, each of the four layers can comprise staggered and differently-sized first sections A1, A2, A3, A4 and second sections B1, B2, B3, B4. In an example of the staggered relationship, the edge between first section A1 and second section B1 does not align with the edge between first section A2 and second section B2. Different staggering schemes are possible and the configurations illustrated herein are merely exemplary. A ring that is constructed wherein the joints between the edges are staggered throughout the structure can provide increased overall strength and unity to the ring. Also shown in FIG. 3b is an indication of a potential aperture 38 through each layer. Because of the staggered configuration of each layer, the first and second sections may not have the apertures in the same position on the first and second sections. For example, first section A4 may have an aperture in a different position than an aperture in first section A3 in order for the apertures to align.

Figure 4A:
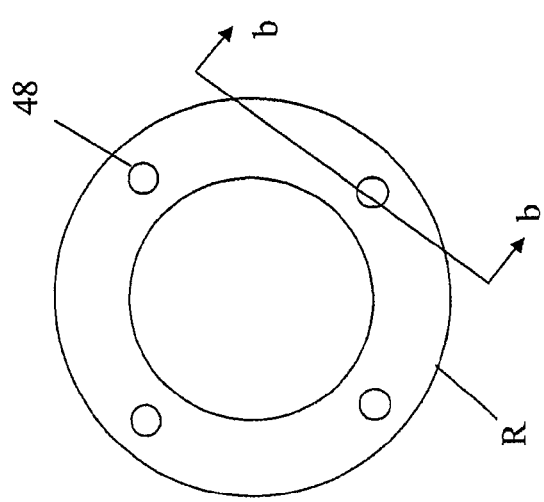
FIG. 4a shows a top view of a ring according to an embodiment of the present invention.
Figure 4B:
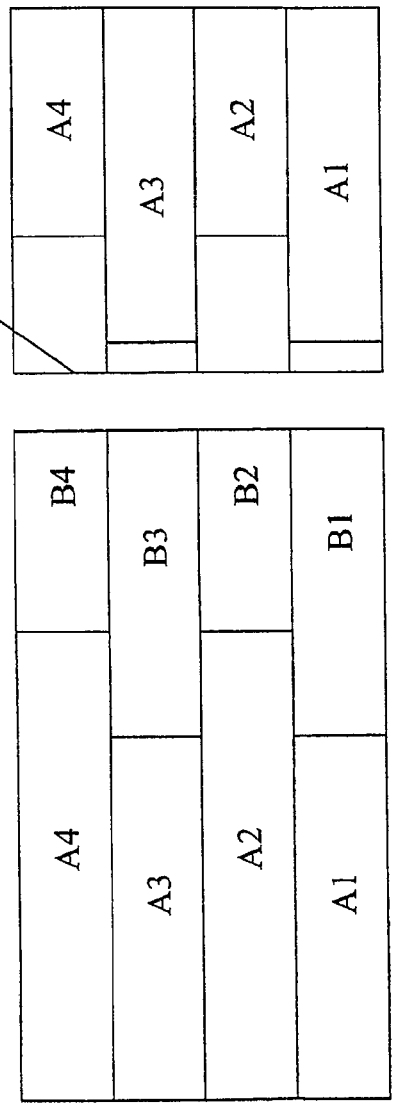
FIG. 4b shows a cross section of a ring according to an embodiment of the present invention.

In another embodiment, FIG. 4a shows a top view of a ring R having a plurality of layers of rings and a plurality of apertures 48. As shown in FIG. 4b, a cross-section of ring R through line b-b, each of the four layers can comprise staggered first sections A1, A2, A3, A4 and second sections B1, B2, B3, B4 with the aperture 38 extending therethrough. In this particular embodiment, each alternating layer is substantially aligned. For example, second section B2 is aligned with second section B4. As a result of aligning the second sections in this or a similar configuration, the aperture 48 can be used for riveting, joining, or other method of attaching the second sections together and the first sections together. In one example, a rivet extends through aperture 48 to connect second sections B1, B2, B3, B4. When disassembling the system, the second sections B1, B2, B3, B4 can be removed as a single unit. Additionally, when configuring the first and second sections to determine where the apertures 48 can be positioned, it can be useful to have a configuration where the second sections are substantially aligned such that an aperture can extend through each second section B1, B2, B3, B4.

Figure 5A:
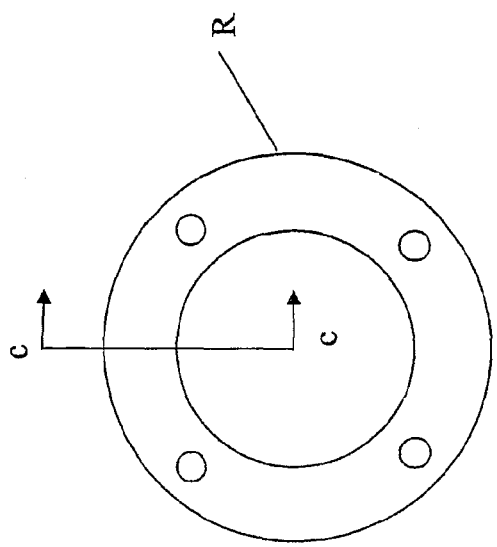
FIG. 5a shows a top view of a ring according to an embodiment of the present invention.
Figure 5B:
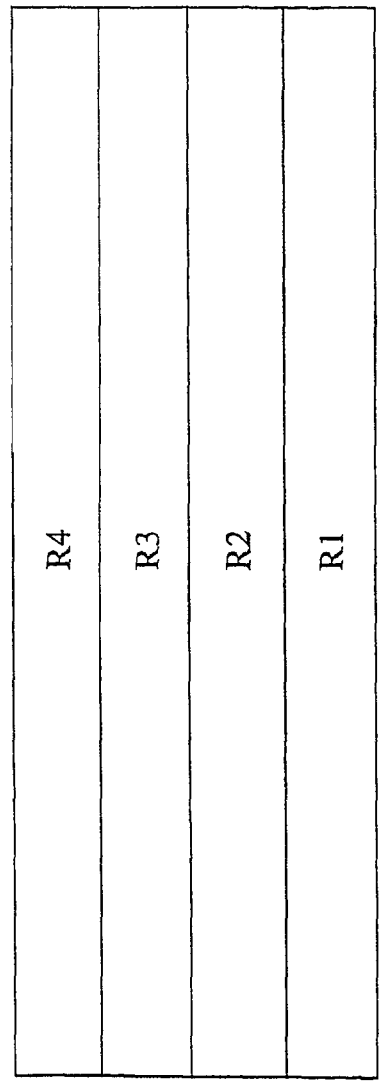
FIG. 5b shows a cross section of a ring according to an embodiment of the present invention.

In yet another embodiment, FIG. 5a shows a top view of ring R having a plurality of layers of rings. As shown in FIG. 5b, a cross-section of ring R through line c-c, the ring R has four layers R1, R2, R3, R4 stacked upon each other. Because each joint between first and second section edges is staggered, ring layers R1, R2, R3, R4 can be either a first or second section of a ring. Additionally, in this exemplary embodiment, the cross-section of each layer R1, R2, R3, R4 results in that first or second section comprising the entire cross-section of that layer.

Referring to FIGS. 6a and 6b, exemplary embodiments are shown for a configuration of ring layers. As shown in FIG. 6a, a ring has a first section 60 and second section 61, each having a plurality of apertures 63. A first section 64 of a second ring is offset from the first section 60 of the top ring. In this particular embodiment, the apertures 63 are aligned substantially throughout the layers. As shown in FIG. 6b, a ring has a first section 65 and second section 66, each having a plurality of apertures 67. In this particular embodiment, a first section 68 of a second ring is not offset from the first section 65 of the top ring. However, a first section 69 of a third ring is offset from both the first and second ring first sections 65, 68. In this embodiment, the apertures 67 are aligned substantially throughout the layers. As an alternative to these exemplary embodiments, the ring layers can be formed as a single unit. For example, the first sections 60, 64, and the alternating layers beneath, can be formed as a single first section with extending flanges that interlock with the second sections. In this alternative configuration, the system retains the ability to disassemble the ring structure by separating a first section from a second section.

In FIG. 6a, the second section 61 in the top layer is offset from the second section 62 of the second layer. This pattern can repeat throughout the system. In this configuration, apertures 63 extending through both second section 61 and second section 62 can utilize the same configuration for both second section 61 and second section 62. In other words, when manufacturing second sections, a manufacturer can make only one second section having apertures therein. For example, as shown in FIG. 6a, the apertures 63 on second section 61 can align with the apertures in second section 62, even though second section 62 is offset from second section 61. This can be accomplished by flipping or turning over second section 62 before installation in the assembly. Accordingly, the apertures that were offset can now be aligned. Once the apertures are aligned, as discussed herein, the first sections can be substantially attached together and the second sections can be substantially attached together.

Rings that can be constructed in the manner described herein directly on the shaft can eliminate the need to disassemble the entire apparatus. Another advantage to constructing rings as described herein is that when pressure is exerted on the ring in an axial direction, the interlocked sections of the ring can be forced together to form a tighter seal.

The sets of complementary first and second sections can be held together with fasteners, such as set screws, pins, or other fastening means known in the art, extending through the apertures in the faces of the rings. In one embodiment, each layer has identically-sized first and second sections. By rotating each subsequent layer 90 or 180 degrees, no two adjacent layers have the same configuration of segments, but yet the four apertures will be aligned. Accordingly, a more unified ring can be produced. In addition to the fasteners mentioned above, the ring segments can be held together by welding (such as PTFE welding), hot melt glue, or polymer adhesive injected into the apertures. Further, in an alternative embodiment, the ring segments may be held together with an adhesive placed between the layers of the rings. The means for attaching or affixing the layers to each other can be any means known to one of ordinary skill in the art.

In one embodiment of the present invention, a flush ring or lantern ring can be constructed according to the method described herein. To create such a ring, the first and second complementary sections comprise slightly less than 100% of the circumference of the ring. Accordingly, when the flush ring or lantern ring is assembled, at least one channel can be created between the edges of the first and second sections to creates a flow path for flushing media to enter the packing set or, alternatively, a path for fluid to exit the packing set in a controlled manner so as to reintroduce it into the apparatus. Additionally, ports, vents, etching, relieving, or similar enhancement known in the art can be applied to give the ring variable flush media performance characteristics.

The material of the ring can be any material known to one of ordinary skill in the art. In one embodiment, the ring is constructed from a material such as polytetrafluoroethylene (PTFE). In another embodiment, the ring material comprises a PTFE selected from the GYLON® family of PTFE materials manufactured by Garlock Sealing Technologies, LLC (Palmyra, N.Y.). GYLON® is a restructured PTFE with bi-directional orientation, which reduces creep and cold flow problems associated with PTFE products, while retaining other positive characteristics of PTFE.

Figure 7:
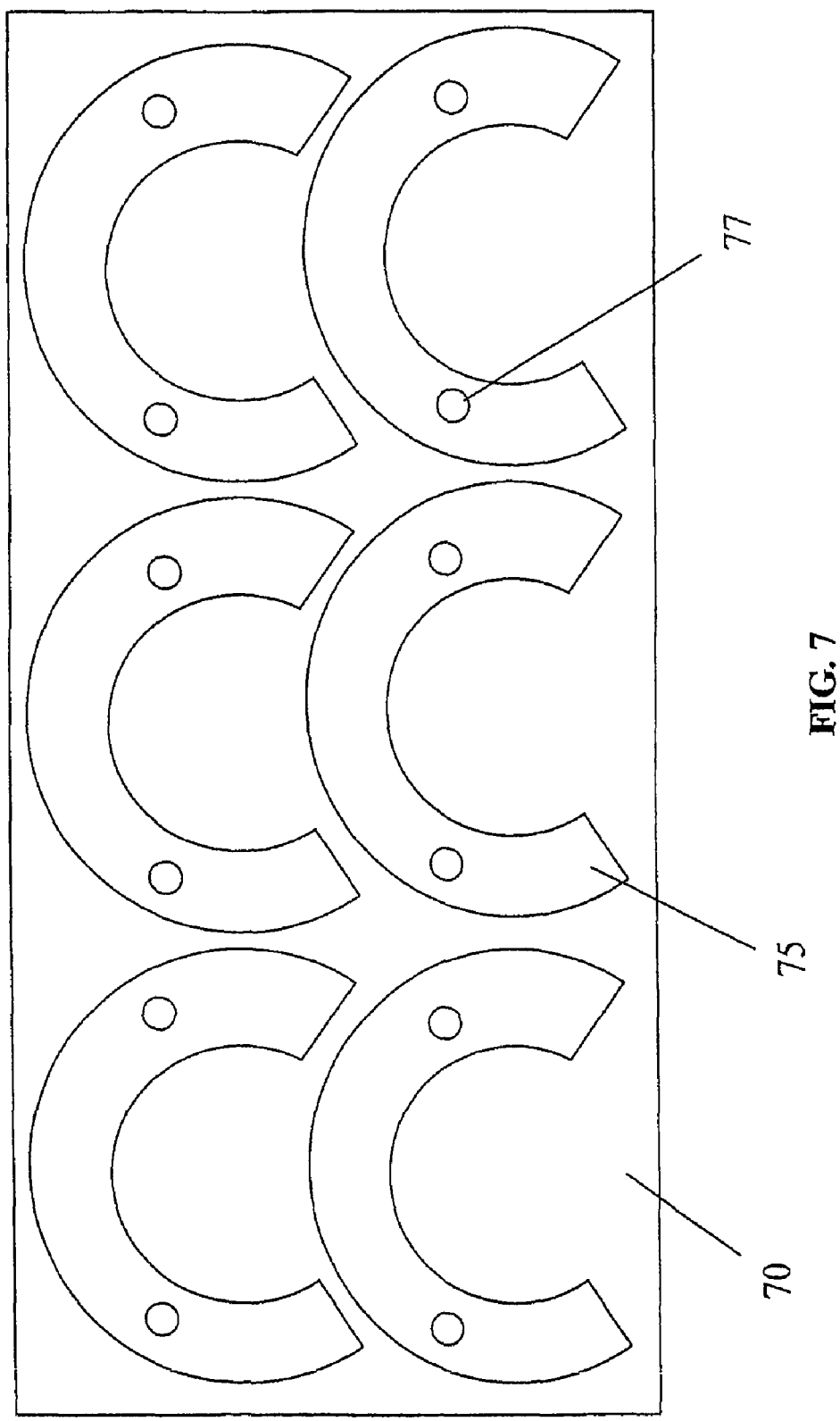
FIG. 7 shows a sheet for providing a component according to an embodiment of the present invention.

Generally, the materials employed can comprise plates or sheets of material that are cut to a desired shape, including both the inner diameter and outer diameter. The thickness of each ring unit can depend upon the material from which the pieces are constructed. The use of standard sheet material can be used to provide the complimentary first and second sections for assembly. Generally, standard material sizes comprise thicknesses of 1/32 in, 1/16 in, 1/8 in, and 3/16 in. In an example of using a standard sheet material to assemble a multi-layer ring, if a ⅛ in gasket material were used, 6 ring units would be stacked upon one another to complete a finished ring that is ¾ in high. Referring to FIG. 7, a standard sheet 70 is shown from which a plurality of first sections 75 can be cut. This is merely exemplary and is not intended to be drawn to scale or represent the minimum, maximum, or preferred configurations of first and second sections that can be cut from a standard sheet. Optionally, a plurality of apertures 77 can be produced before, during, or after the process of cutting the first or second sections.

The process of producing ring sections can be performed to assemble any of the variety of non-packing rings employed in a conventional stuffing box known to one of ordinary skill in the art, such as excluder rings, spacer rings, gaskets, and restriction bushings. As such, the rings can be fabricated out of suitable materials including, but not limited to, rubber, cast iron, plastics, and other such materials that perform a sealing function. The material from which a ring is fabricated is generally dictated by the application in which it is intended to be used. Additionally, one skilled in the art will recognize that the method described herein can be employed to replace rings or seals around a shaft in a variety of applications where it would be cumbersome or time consuming to dismantle the apparatus and/or remove the shaft.

Figure 8:
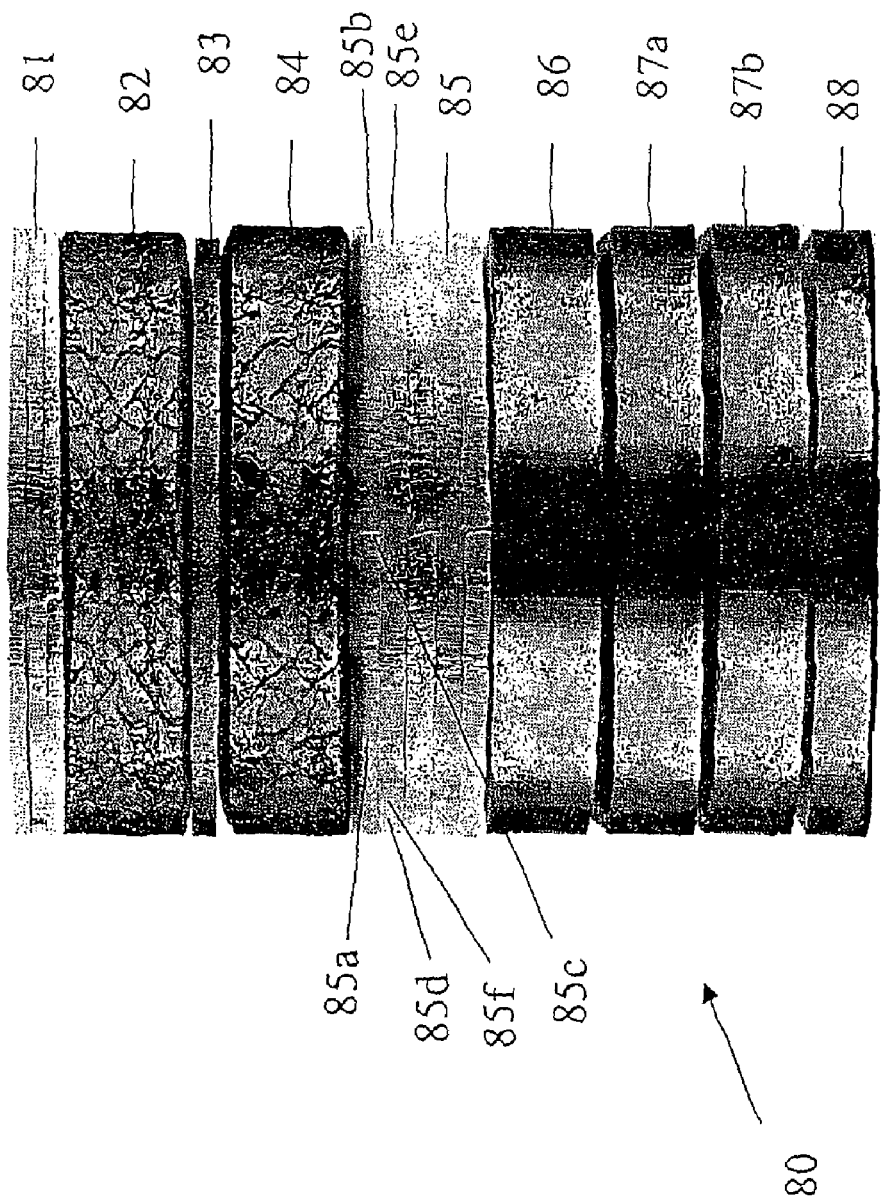
FIG. 8 shows a system incorporating an embodiment of the present invention.

Referring to FIG. 8, a system 80 is shown utilizing a ring described herein. In this exemplary embodiment, the system 80 is used for water conservation by providing a substantially leak-free rotary seal. An excluder ring 81 comprises three rings composed of complimentary first and second sections, as described above. A pressure barrier ring 85 comprises five rings composed of complimentary first and second sections, as described above. As shown in FIG. 8, joints between the first and second sections of each ring layer do not align with the adjacent layer. For example, a first layer has a first section 85a and a second section 85b, which abut at joint 85c. A second layer has a first section 85d and a second section 85e, which abut at joint 85f. Because of the staggered relationship between the first and second layers, the joint 85c is not aligned with the joint 85f. The system 80 also comprises a first braided flexible graphite ring 82, a spacer ring 83, a second braided flexible graphite ring 84, an adapter ring 86, at least two center rings 87a, 87b, and a second adapter ring 88. By using the ring layers described herein, this system does not require a costly dismantling process or back-up equipment. The layers can be split so that machinery can be serviced without uncoupling a motor.

Although the present invention has been described with reference to particular embodiments, it should be recognized that these embodiments are merely illustrative of the principles of the present invention. Those of ordinary skill in the art will appreciate that the apparatus and methods of the present invention may be constructed and implemented in other ways and embodiments. Accordingly, the description herein should not be read as limiting the present invention, as other embodiments also fall within the scope of the present invention.

What is claimed is:

1. A method for installing an auxiliary ring around a shaft, the method comprising:
    providing an auxiliary ring comprising a plurality of ring elements, each ring element including at least one radial joint;
    installing each ring element around the shaft;
    positioning the plurality of ring elements wherein the radial joint of at least one of the ring elements is rotationally offset from the radial joint of each adjacent ring element such that the radial joint of at least one of the ring elements does not overlap the radial joint of each adjacent ring element; and
    securing the plurality of ring elements to each other.

2. The method of claim 1, wherein securing the plurality of ring elements to each other is accomplished by application of an adhesive.

3. The method of claim 1, wherein securing the plurality of ring elements to each other is accomplished by welding.

4. The method of claim 1, further comprising positioning the plurality of ring elements wherein the radial joint of each ring element is rotationally offset from the radial joint of each adjacent ring element.

5. The method of claim 4, wherein each ring element includes an aperture and further comprising aligning the aperture of each ring element with the aperture of each adjacent ring element.

6. The method of claim 5, wherein securing the plurality of ring elements to each other is accomplished by inserting a fastener through the aperture of each ring element.

7. The method of claim 5, wherein securing the plurality of ring elements to each other is accomplished by applying adhesive into the aperture of each ring element.

8. The method of claim 1, wherein each ring element comprises first and second sections separated by a pair of radial joints and further comprising positioning the plurality of ring elements wherein each radial joint of each ring element is rotationally offset from each radial joint of each adjacent ring element.

9. The method of claim 8, wherein the first section of each ring element comprises a majority of the ring element.

10. The method of claim 8, wherein each first section includes an aperture and further comprising:
    turning over the first section of alternating ring elements; and
    aligning the aperture of each ring element with the aperture of each adjacent ring element, whereby each radial joint of each ring element is rotationally offset from each radial joint of each adjacent ring element.

11. A method for installing a shaft seal around a shaft, the method comprising:
    providing an auxiliary ring comprising a plurality of ring elements, each ring element including at least one radial joint wherein each of the at least one radial joints extends substantially along a radius of the ring element;
    providing packing material;
    installing the auxiliary ring on the shaft, including:
    installing each ring element around the shaft;
    positioning the plurality of ring elements wherein the radial joint of at least one of the ring elements is rotationally offset from the radial joint of each adjacent ring element; and
    securing the plurality of ring elements to each other; and
    installing at least a portion of the packing material around the shaft to form a packing ring that is adjacent to the auxiliary ring.

12. The method of claim 11, wherein providing packing material is accomplished by providing braided flexible graphite.

13. The method of claim 11, further comprising providing a plurality of auxiliary rings and installing the auxiliary rings on the shaft.

14. The method of claim 13, further comprising installing at least a portion of the packing material around the shaft to form a pair of packing rings.

15. The method of claim 11, wherein each ring element includes an aperture and further comprising aligning the aperture of each ring element with the aperture of each adjacent ring element.

16. The method of claim 15, wherein securing the plurality of ring elements to each other is accomplished by inserting a fastener through the aperture of each ring element.

17. A method for installing a shaft seal around a shaft, the method comprising:
   providing an auxiliary ring comprising a plurality of ring elements, each ring element including a plurality of segments terminating in radial joints that extend substantially along a radius of the ring element;
   providing packing material;
   installing the auxiliary ring on the shaft, including:
   installing each ring element around the shaft;
   positioning the plurality of ring elements wherein the radial joint of at least one of the ring elements is rotationally offset from and non-overlapping with the radial joint of each adjacent ring element; and
   securing the plurality of ring elements to each other; and
   installing at least a portion of the packing material around the shaft to form a packing ring that is adjacent to the auxiliary ring.

* * * * *